US011359260B2

United States Patent
An et al.

(10) Patent No.: US 11,359,260 B2
(45) Date of Patent: Jun. 14, 2022

(54) METHOD OF INHIBITING DEGRADATION OF EXTRACTANT BY ANHYDROUS ENVIRONMENT AVOIDING AND METAL STRIPPING

(71) Applicant: KOREA RESOURCES CORPORATION, Wonju-si (KR)

(72) Inventors: Jeon Woong An, Wonju-si (KR); Youn Kyu Yi, Wonju-si (KR); Kyung Bae Jung, Wonju-si (KR); Seung Ho Lee, Ansan-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 300 days.

(21) Appl. No.: 16/560,192

(22) Filed: Sep. 4, 2019

(65) Prior Publication Data
US 2021/0062297 A1 Mar. 4, 2021

(51) Int. Cl.
C22B 19/20 (2006.01)
C22B 3/00 (2006.01)
(Continued)

(52) U.S. Cl.
CPC ........ *C22B 23/043* (2013.01); *B01D 11/0446* (2013.01); *B01D 11/0492* (2013.01); *C22B 7/007* (2013.01); *C22B 19/22* (2013.01)

(58) Field of Classification Search
USPC ....................................................... 422/258
See application file for complete search history.

(56) References Cited

U.S. PATENT DOCUMENTS 4,210,625 A * 7/1980 Flett ...................... C22B 3/3846
423/139
4,401,531 A * 8/1983 Martin San Lorenzo ..................
C22B 19/22
423/106

(Continued)

FOREIGN PATENT DOCUMENTS

CN 102242266 A * 11/2011
WO WO-2012156894 A2 * 11/2012 ........... C22B 60/026

OTHER PUBLICATIONS

English translation of CN 102242266 (originally published Nov. 16, 2011) from Espacenet.*

*Primary Examiner* — George Wyszomierski
(74) *Attorney, Agent, or Firm* — Cantor Colburn LLP

(57) ABSTRACT

Provided is a method of inhibiting degradation of an extractant by an anhydrous environment avoiding and metal stripping, the method including the steps of: (a) stopping the addition of soda ash ($Na_2CO_3$) to an extracting reaction tank; (b) starting solution recirculation and stopping solvent recirculation of a settler; (c) supplying a solvent from a loaded organic tank to a scrubbing reaction tank, in which the scrubbing reaction tank, stripping reaction tank and extracting reaction tank are connected for circulation and operating stirrers of the scrubbing reaction tank, stripping reaction tank and extracting reaction tank; (d) supplying a sulfuric acid solution having a controlled concentration with a diluting solution to the stripping reaction tank; (e) transferring the solvents of the settler, the loaded organic tank and all the pipes to the scrubbing reaction tank; and (f) stopping the step (e) and initiating solvent recirculation.

5 Claims, 4 Drawing Sheets

(51) Int. Cl.
    *B01D 11/04*    (2006.01)
    *C22B 7/00*    (2006.01)

(56) References Cited

U.S. PATENT DOCUMENTS

| | | | |
|---|---|---|---|
| 5,645,708 A * | 7/1997 | Jones | C22B 15/0069 |
| | | | 205/580 |
| 6,350,354 B1 * | 2/2002 | Neuman | C22B 15/0063 |
| | | | 204/233 |
| 2004/0050212 A1 * | 3/2004 | Cheng | C22B 3/32 |
| | | | 75/722 |
| 2010/0089764 A1 * | 4/2010 | Torres | C22B 23/0461 |
| | | | 205/589 |
| 2011/0283838 A1 * | 11/2011 | Jones | C22B 23/0476 |
| | | | 75/743 |

\* cited by examiner

METHOD OF INHIBITING DEGRADATION OF EXTRACTANT BY ANHYDROUS ENVIRONMENT AVOIDING AND METAL STRIPPING

BACKGROUND OF THE INVENTION

1. Field of the Invention

The present invention relates to a method of inhibiting the degradation of extractants, and more specifically, a method of inhibiting the degradation of extractants by anhydrous environment avoiding and metal stripping in order to inhibit the degradation of extractants by the shutdown in Boleo cobalt/zinc solvent extraction (synergistic solvent extraction, hereinafter referred to as DSX).

2. Description of the Related Art

The cobalt/zinc solvent extraction is a process of simultaneously extracting cobalt and zinc using two solvents, and the operation is carried out in the same manner as ordinary solvent extraction.

FIG. 1 is a simplified process diagram for Boleo cobalt/zinc solvent extraction (synergistic solvent extraction, DSX).

The DSX process includes a pregnant leached solution storage tank (DSX feed tank) 10 for storing the pregnant leached solution, a raffinate storage tank 30 for storing the raffinate from which the valuable metal is extracted at the extraction end, solvent storage tank (loaded organic tank) 20 for storing and supplying a solvent, a holding tank for storing solution/solvent which flows (drains) in the process for various reasons, a coalescer 40 for recovering the solvent from the stripping solution and the raffinate, a crud treatment device for treating crud which is an impurity generated in the operation and the like.

The DSX process consists of total six steps including two extracting steps using extracting reaction tanks 50 such as E1 and E2, two scrubbing steps using two scrubbing reaction tanks 60 such as SC1 and SC2, and two stripping steps using two stripping reaction tanks 70 such as S1 and S2.

The extracting step is a process of extracting metals contained in pregnant leached solution by adjusting the optimum extraction pH of cobalt/zinc with soda ash ($Na_2CO_3$). Since metal-extracted solvent contains manganese, which is an impurity, the manganese is removed in the scrubbing step.

In the scrubbing step, the concentration of zinc is adjusted to supply the solution. The solution is reacted with the solvent containing manganese. Thus, the substitution reaction is induced so that zinc is extracted by a solvent, and manganese is stripped by the solution.

Further, in the stripping step, the manganese-removed solvent and the sulfuric acid ($H_2SO_4$) concentration-controlled strip feed solution are reacted, and the metal ions extracted in the solvent are all stripped and concentrated in the solution. The metal-stripped solvent through the stripping step is again transported to the extracting step for use to extract the metal and repeat the circulation step of the DSX process.

When the solution/solvent (aqueous/organic) cannot circulate due to shutdown due to facility and planned maintenance of plant, in general solvent extraction, the entire solvent residing in the loaded organic tank, various agitation tanks and settler is exposed to anhydrous conditions, unlike Boleo cobalt/zinc solvent extraction in DSX Process.

However, even during the shutdown, the solution/solvent stays stably, and the residual solvent does not seriously affect the degradation of the extractant even when exposed to an anhydrous environment.

Copper solvent extraction, for example, in conventional solvent extraction, does not have a separate procedure for circulating the solution/solvent when shut down due to power failure. Further, when the extraction is shut down due to damage to the settler, no bypass line is available, and the solution/solvent of the entire process cannot be circulated except for the self-circulation of the settler. This is the reason why it is not considered in the general solvent extraction operation because there is no great influence on the degradation of the extractant even when exposed to an anhydrous environment.

Further, there is a case where the solvent is partially exposed to the anhydrous environment as described above even in the normal solvent extraction operation of general solvent extraction. For example, raffinate and stripping solution are separated into solution and solvent through the coalescer 40, then the stripping solution is transferred to the next step, and the solvent is recovered and transferred to a holding tank. The solvent recovered in the holding tank without the stirring function is exposed to an anhydrous environment to stay for a certain time and recovered through a crud treatment device as necessary.

Unlike the general solvent extraction described above, in the DSX process, degradation of oxime by hydrolysis occurs when organic acid is present. In the degradation of the oxime, which is an extractant, the neodecanoic acid-based extractant acts as an organic acid and affects the oxime degradation irrespective of the concentration. Further, 2-ethyl hexanoic acid, which is the self-product of the degradation of the extractant, affects the degradation of the extractant, and when not separated from the solvent, it concentrates and promotes degradation. 2-ethyl hexanoic acid is water-soluble and has high solubility and is not concentrated in the solvent since it is dissolved and discharged in the solution in a water environment (pregnant leached solution+solvent).

However, in some cases, the degradation of the extractant can be accelerated when the solvent is set in an anhydrous environment. It has a mechanism in which 2-ethyl hexanoic acid, which is a degradation product, is continuously produced and can be concentrated without releasing from the DSX process system, and the degradation product again accelerates the degradation of the extractant.

Due to the influence of the extractant degradation, the DSX process must prevent the anhydrous environment because the solvent has a serious effect on the degradation of the extractant when exposed to an anhydrous environment.

Further, when the DSX process has difficulty to circulate the solution/solvent during the operation for some reason, the metal extracted in the solvent must be rapidly stripped to keep low mol total metal/mol oxime. When the metal in the solvent is not stripped in the above-mentioned situation, the mol total metal increases relative to the stripped solvent, and the mol total metal/mol oxime increases, which thus seriously affects the degradation of the extractant. Therefore, the shutdown procedure must include a stripping step to remove the metal contained in the solvent. Efforts are needed to keep the mol total metal/mol oxime low in the DSX process to inhibit the degradation of the extractant even in the above-mentioned situation.

If the DSX process is operated in the same manner as general solvent extraction in a situation in which the solution/solvent circulation is difficult or the solvent is in an anhydrous environment, it allows accelerating the degradation. Thus, the DSX process cannot be operated by the same manner as general solvent extraction.

SUMMARY OF THE INVENTION

Accordingly, an object of the present invention is to provide a novel method which includes anhydrous environment avoiding and metal stripping to inhibit the degradation of the extractant caused by the shutdown in the Boleo cobalt/zinc solvent extraction process.

In order to address the above-described issues, the present invention provides a method of inhibiting degradation of extractant by anhydrous environment avoiding and metal stripping, the method including the steps of: (a) stopping the addition of soda ash ($Na_2CO_3$) to an extracting reaction tank; (b) starting solution recirculation and stopping solvent recirculation of a settler; (c) supplying a solvent from a loaded organic tank to a scrubbing reaction tank, in which the scrubbing reaction tank, stripping reaction tank and extracting reaction tank are connected for circulation and operating stirrers of the scrubbing reaction tank, stripping reaction tank and extracting reaction tank; (d) supplying a sulfuric acid solution having a controlled concentration with a diluting solution to the stripping reaction tank; (e) transferring the solvents of the settler, the loaded organic tank and all the pipes to the scrubbing reaction tank; and (f) stopping the step (e) and initiating solvent recirculation.

Further, the present invention provides the method in which the step (f) further includes step (g) of recovering the solvent from coalescer and crud treatment device.

Further, the present invention provides the method in which the flow rate of the supplied solvent in the step (c) is 400 m³/hr to 1,000 m³/hr.

Further, the present invention provides the method in which the concentration of sulfuric acid in the step (d) is 5 g/L to 50 g/L.

Further, the present invention provides the method in which a scrubbing feed solution having the sulfuric acid concentration of 2 g/L to 30 g/L and zinc concentration of g/L to 20 g/L is supplied with the solvent to the scrubbing reaction tank in the step (e).

An object of the present invention provides a novel method including anhydrous environment avoiding and metal stripping in Boleo cobalt/zinc solvent extraction to have effects of preventing the degradation of extractants by the shutdown of the process.

DETAILED DESCRIPTION OF THE PREFERRED EMBODIMENT

Hereinafter, exemplary embodiments of the present invention are described in detail with reference to the accompanying drawings, which are readily apparent to those skilled in the art to which the present invention pertains. The present invention may be embodied in many different forms and is not limited to the exemplary embodiments described herein.

Figure 1:
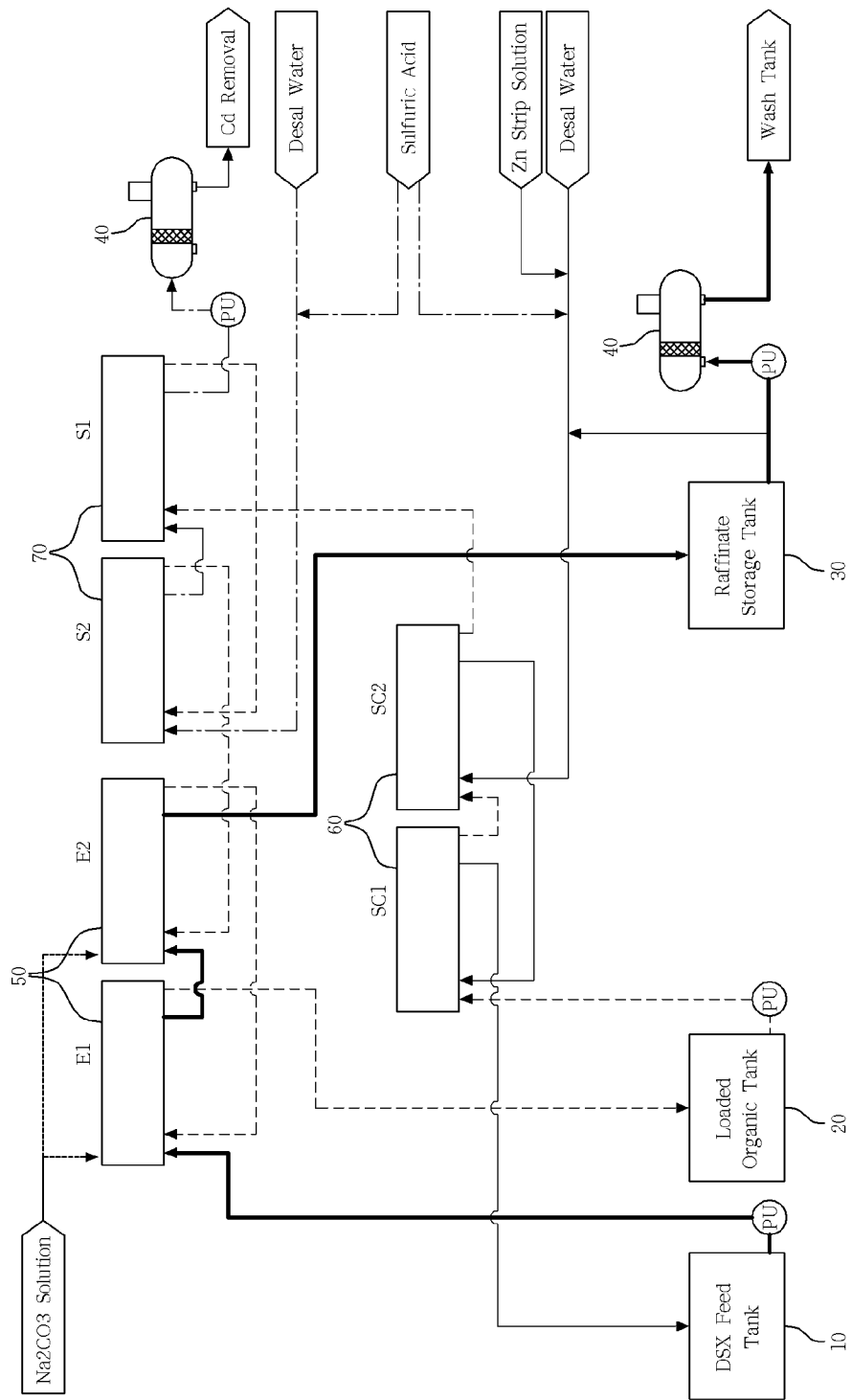
FIG. 1 is a simplified process diagram for Boleo cobalt/zinc solvent extraction (synergistic solvent extraction, DSX).
Figure 2:
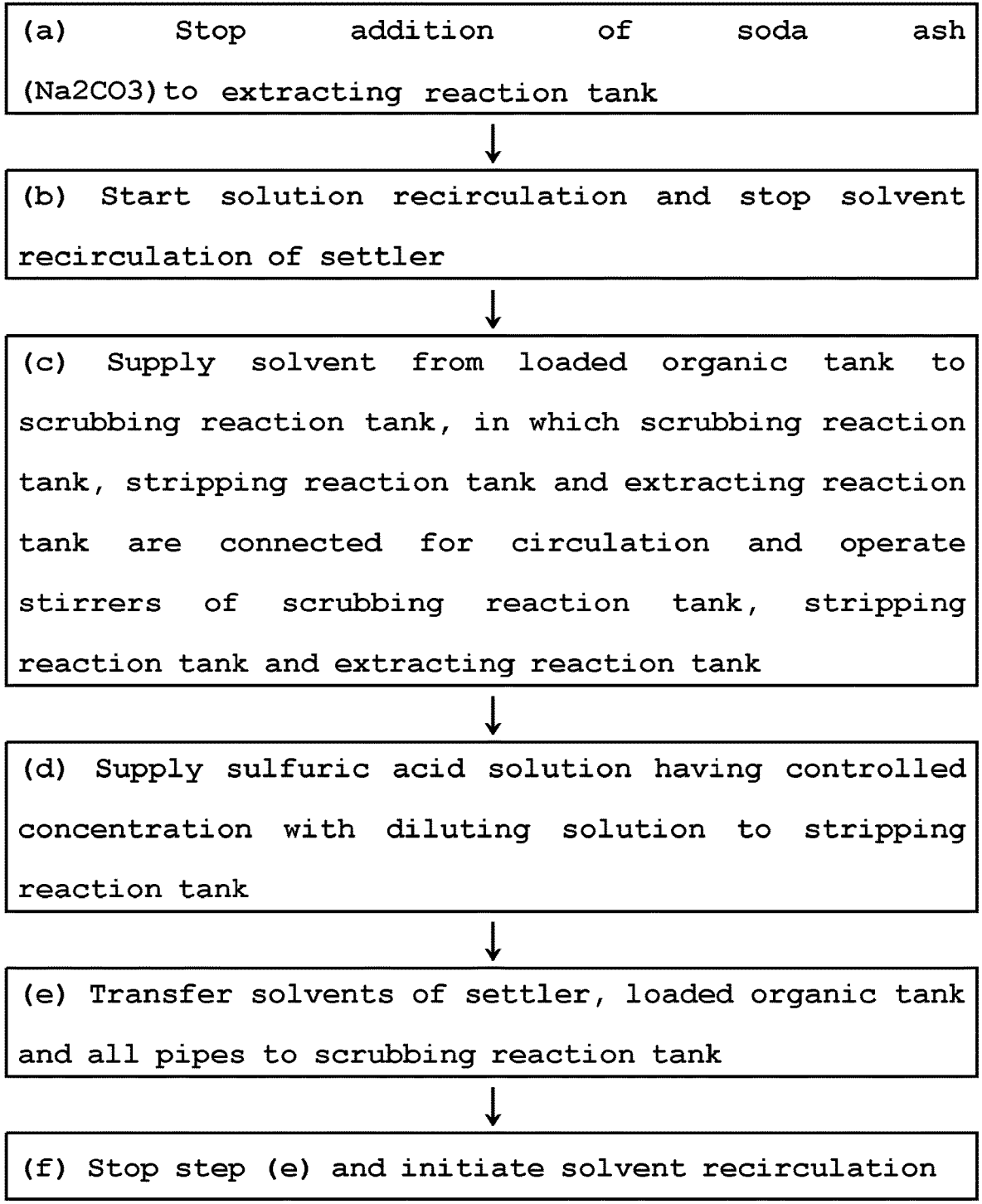
FIG. 2 is a flowchart of inhibiting degradation of extractant according to an embodiment of the present invention.

FIG. 2 is a flowchart of inhibiting degradation of extractant according to an embodiment of the present invention.

Referring to FIG. 2, the method of inhibiting the degradation of extractants according to the present invention relates to the method including the steps of: (a) stopping the addition of soda ash ($Na_2CO_3$) to an extracting reaction tank; (b) starting solution recirculation and stopping solvent recirculation of a settler; (c) supplying a solvent from a loaded organic tank to a scrubbing reaction tank, in which the scrubbing reaction tank, stripping reaction tank and extracting reaction tank are connected for circulation and operating stirrers of the scrubbing reaction tank, stripping reaction tank and extracting reaction tank; (d) supplying a sulfuric acid solution having a controlled concentration with a diluting solution to the stripping reaction tank; (e) transferring the solvents of the settler, the loaded organic tank and all the pipes to the scrubbing reaction tank; and (f) stopping the step (e) and initiating solvent recirculation.

Further, the method of inhibiting the degradation of extractants according to the present invention may further include (g) recovering the solvent from coalescer 40 and crud treatment device.

In the step (a), for example, the diluent includes a kerosene series, and the extractant includes an oxime-based extractant and a neodecanoic acid-based extractant in the DSX solvent. When the DSX operation is shutdown, the addition of the soda ash ($Na_2CO_3$) into the extracting reaction tank 50 is stopped to adjust the pH of the extraction end, and the automatic pH adjustment device is stopped.

In the step (b), the settler is connected to the extracting reaction tanks (E1 and E2) 50, the scrubbing reaction tanks (Sc1 and Sc2) 60 and the stripping reaction tanks (S1 and S2) 70. The solution of settler is recirculated, and the recirculation of the solvent is stopped while stopping the pH adjustment of the step (a).

In the step (c), the scrubbing reaction tank, stripping reaction tank and extracting reaction tank are connected for circulation so that when the solvent is supplied from a loaded organic tank to scrubbing reaction tank, the solvent is sequentially circulated to the connected stripping reaction tank and extracting reaction tank. The stirrers of the scrubbing reaction tank, stripping reaction tank and extracting reaction tank are operated. The higher the flow rate of the feed solvent, the faster the removal of organic acids (e.g., 2-ethyl hexanoic acid) produced by degradation and impurities precipitated by the shutdown of the process. Thus, the solvent may be supplied at a flow rate of 400 m³/hr to 1,000 m³/hr, preferably 400 m³/hr to 800 m³/hr, and more preferably 500 m³/hr to 700 m³/hr.

When the solvent is supplied, the stripping feed solution is supplied to the stripping reaction tank S2 in order to supply the stripping solution of the stripping reaction tank S1 to the surge tank. The stripping feed solution may be mixed with sulfuric acid. The mixture is diluted with a diluting solution containing fresh water and adjusted to a concentration of sulfuric acid of 5 g/L to 50 g/L, preferably 10 g/L to 30 g/L. In the step (d), the sulfuric acid solution having the concentration adjusted in the above step may be supplied to the stripping reaction tank S2, and then the stripping solution may be sent to the surge tank via the stripping reaction tank S1.

In the step (e), the stripping feed solution is put into the stripping reaction tank S1, and then the solvent is continuously supplied to the scrubbing reaction tank Sc1 for stripping the DSX process solvent. The solvent supply pump is operated until all solvents in the settler, the loaded organic tank 20 and each connecting pipe are stripped, and the settler includes a settler connected to the extracting reaction tank (E1 and E2) 50 and the scrubbing reaction tanks (Sc1 and Sc2) 60.

The stripping step is performed according to the following reaction formula, and the metal extracted in the solvent can be stripped.

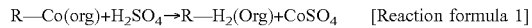

$$R-Co(org)+H_2SO_4 \rightarrow R-H_2(Org)+CoSO_4 \quad \text{[Reaction formula 1]}$$

$$R-Zn(org)+H_2SO_4 \rightarrow R-H_2(Org)+ZnSO_4 \quad \text{[Reaction formula 2]}$$

After the stripping step is carried out, all metals extracted in the solvent are stripped, and the mol total metal is lowered in the mol total metal/mol oxime, so that degradation of the extractant can be suppressed.

If all metals are stripped from the solvent in the step (e), the scrubbing feed solution supplied to the scrubbing reaction tank S2 is stopped to supply in the step (f).

In the step (e), the solvent of the loaded organic tank may be transferred to the scrubbing reaction tank Sc1 to be scrubbed, and the manganese (Mn) may be removed from the solvent through the scrubbing step. When the solvent is supplied from the loaded organic tank 20, the scrubbing solution is supplied to the scrubbing reaction tank Sc1. The scrubbing feed solution may be supplied by adjusting the concentration of sulfuric acid to 2 g/L to 30 g/L, preferably 5 g/L to 15 g/L with a sulfuric acid and a zinc solution. Further, the scrubbing feed solution may be supplied by adjusting a zinc concentration of 2 g/L to 20 g/L, preferably 2 g/L to 15 g/L.

The scrubbing step is carried out according to the following reaction formula, and manganese (Mn), which is an impurity, can be removed.

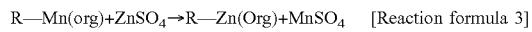

$$R-Mn(org)+ZnSO_4 \rightarrow R-Zn(Org)+MnSO_4 \quad \text{[Reaction formula 3]}$$

After the scrubbing step, the solvent feed pump may be stopped in the step (f), and solvent recirculation may be started in all the settlers.

The operation of all the stirrers can be maintained in the step (g) until all the steps are completed, and the operation is resumed so that the process of shutdown can be carried out.

The step (g) is a step of rapidly recovering the solvent to the process in an anhydrous environment of the solvent which occurs according to the DSX process condition, separately from the shutdown. The solvent may be recovered from coalescer 40 or a crud treatment device in the step (g).

The coalescer 40 is used for a step of recovering a trace amount of solvent contained in the solution before transferring the stripping solution to the surge tank and transferring the raffinate to the raffinate tank. The solvent is recovered to the holding tank through the coalescer 40. The holding tank is a place where the solution and solvent of several stages are gathered according to operation in the process. There is no stirrer, and the solution and solvent are recovered to the process according to on the level. In this regard, the solvent is not mixed with the solution but phase-separated and the degradation of the extractant occurs so that it is quickly recovered to the process.

Further, in the step (f), the solvent collected with the crud for the crud treatment is collected in the crud collection tank during the treatment of the crud. After the treatment, the solvent is collected to the clean organic tank and recovered to the loaded organic tank.

When collected in the tank, the solvent is in an anhydrous environment condition. To prevent this, the crud treatment process is improved so that the solvent is recovered to the process as soon as possible.

The present invention can extend the lifetime of the extractant used in the DSX process by the method of inhibiting degradation of the extractant as described above.

Figure 3:
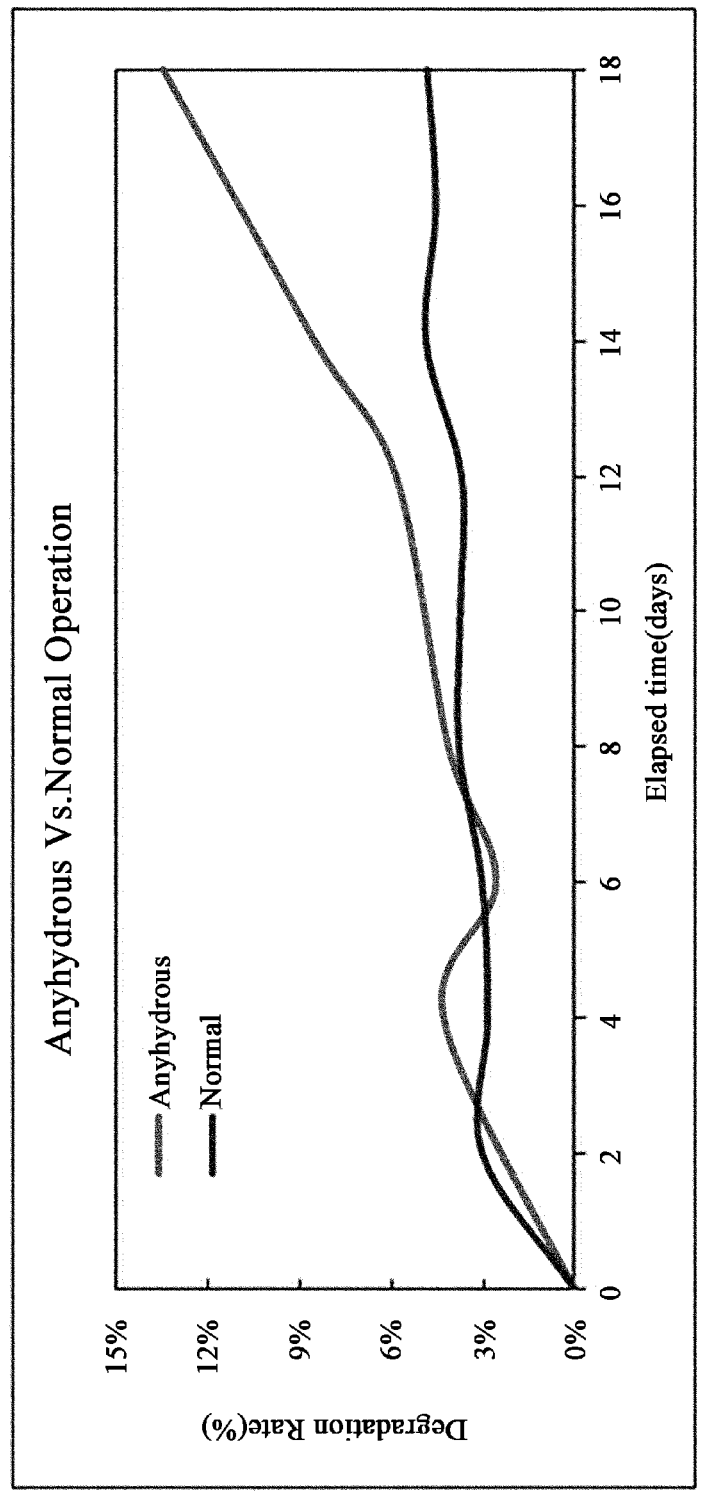
FIG. 3 is a graph illustrating extractant degradation rate depending on whether an anhydrous environment/normal environment according to an embodiment of the present invention.

FIG. 3 is a graph illustrating an extractant degradation rate depending on whether an anhydrous environment/normal environment according to an embodiment of the present invention. The figure shows a similar tendency for about one week, but it can be seen that the difference between anhydrous environment and normal environment increases after 8 days.

When the DSX solvent is exposed to an anhydrous environment, 2-ethyl hexanoic acid, which is a degradation product of the extractant, is not dissolved and not discharged in the solution unlike a normal operating environment and is eventually concentrated in the solvent. This accelerates the degradation of the extractant, and 2-ethyl hexanoic acid, which is a degradation product of the extractant, continues to be produced to accelerate the concentration and the degradation of the extractant.

Figure 4:
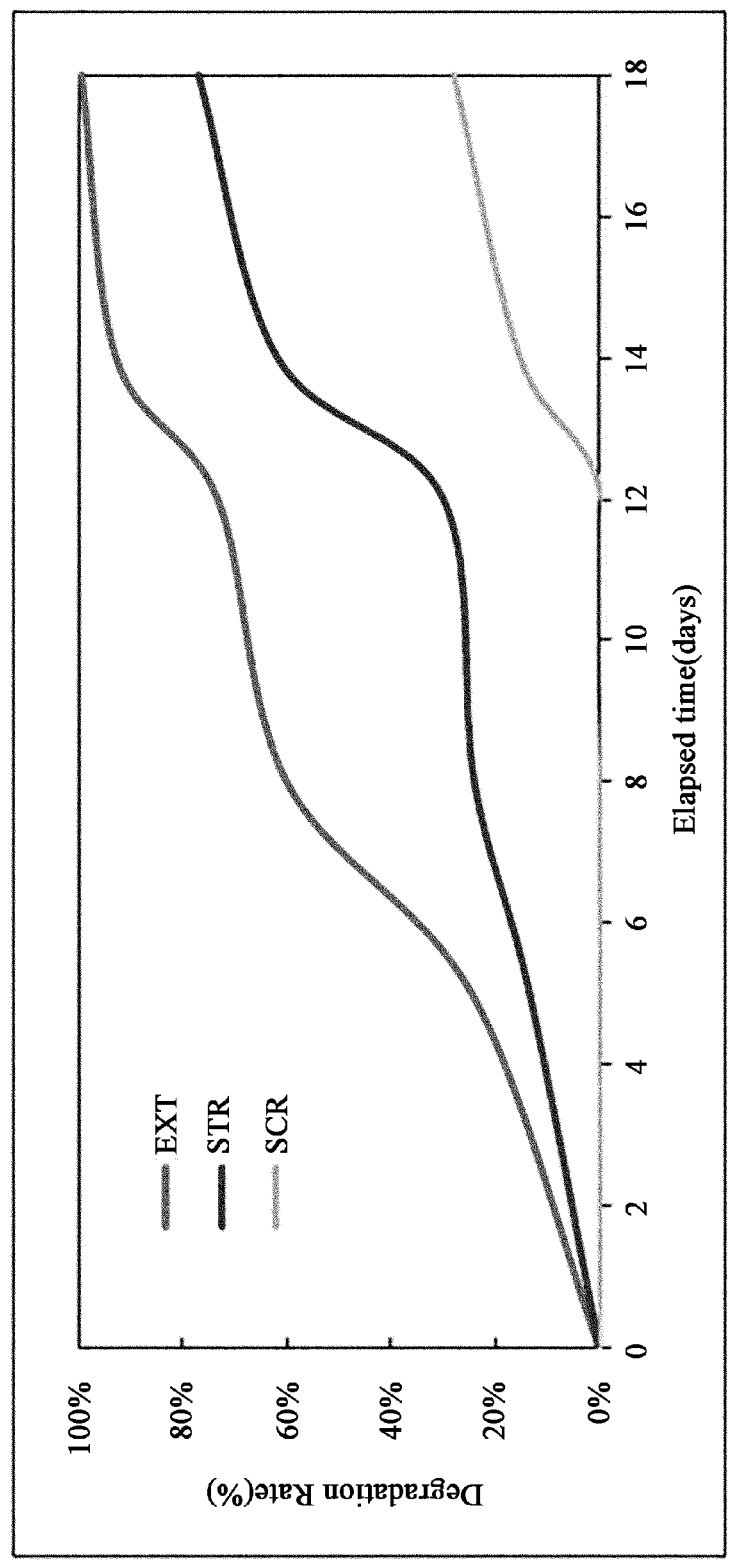
FIG. 4 is a graph illustrating the extractant degradation rate for steps of DSX according to an embodiment of the present invention.

FIG. 4 is a graph illustrating the extractant degradation rate for steps of DSX according to an embodiment of the present invention.

For the metal-concentrated solvent in the extracting step (EXT), the manganese-removed solvent in the scrubbing step (SCR) and the metal-stripped solvent in the stripping step (STR), the extracting step (EXT) containing a large amount of metal has the fastest in the degradation of the extractant, so that the metal is stripped through the same procedure as in the specification, and then the solvent is recirculated.

What is claimed is:

1. A method of performing a solvent extraction and inhibiting degradation of an extractant by avoiding an anhydrous environment, the method comprising the steps of:
   (a) extracting cobalt and zinc from a leached solution by adding soda ash ($Na_2CO_3$) to an extracting reaction tank to provide a raffinate from which cobalt and zinc have been extracted and a residual solution including solvent and the cobalt and zinc extracted from the leached solution;
   (b) feeding the residual solution from the extracting reaction tank to a scrubbing reaction tank;
   (c) scrubbing manganese from the residual solution in the scrubbing reaction tank by supplying a solvent from a loaded organic tank to the scrubbing reaction tank to provide a scrubbed solvent;
   (d) feeding the scrubbed solvent to a stripping reaction tank;
   (e) stripping cobalt and zinc from the scrubbed solvent in the stripping reaction tank by adding a stripping solution to the stripping reaction tank;
   (f) recirculating solvent in a settler connected to the extracting reaction tank, the scrubbing reaction tank and the stripping reaction tank, wherein the scrubbing reaction tank, stripping reaction tank and extracting reaction tank are connected for circulation;
   (g) stopping addition of the soda ash ($Na_2CO_3$) to the extracting reaction tank;
   (h) starting recirculation of a solution of the settler and stopping solvent recirculation of the settler;

(i) operating stirrers of the scrubbing reaction tank, stripping reaction tank and extracting reaction tank;

(j) supplying a sulfuric acid solution with a diluting solution containing fresh water to the stripping reaction tank;

(k) transferring the solvents of the settler, the loaded organic tank and pipes connecting the scrubbing reaction tank, stripping reaction tank and extracting reaction tank to the scrubbing reaction tank; and (l) stopping the step (k) and initiating solvent recirculation.

2. The method of claim 1, wherein
the method further includes
  separating the raffinate and stripping solution into a separated solution and separated solvent in a coalescer, and
  treating a generated impurity in a crud treatment device, and
the step (l) further includes recovering the solvent from the coalescer and crud treatment device.

3. The method of claim 1, wherein the flow rate of the supplied solvent in the step (c) is 400 m$^3$/hr to 1,000 m$^3$/hr.

4. The method of claim 1, wherein a concentration of sulfuric acid in the step (j) is 5 g/L to 50 g/L.

5. The method of claim 1, wherein a scrubbing feed solution having a sulfuric acid concentration of 2 g/L to 30 g/L and zinc concentration of 2 g/L to 20 g/L is supplied with the solvent to the scrubbing reaction tank in the step (k).

* * * * *